United States Patent [19]

Cruz

[11] 4,145,890
[45] Mar. 27, 1979

[54] ENERGY GENERATING DEVICE

[76] Inventor: Luis R. Cruz, 208 Racetrack Rd., Rte. 2, Jacksonville, N.C. 28540

[21] Appl. No.: 781,130

[22] Filed: Mar. 25, 1977

[51] Int. Cl.² .......................... F03G 3/00; F03G 7/06
[52] U.S. Cl. ................................................ 60/675
[58] Field of Search ................. 60/325, 531, 675, 641

[56] References Cited

U.S. PATENT DOCUMENTS

| 250,821 | 12/1881 | Landis | 60/675 |
| 271,639 | 2/1883 | Iske | 60/675 |
| 755,048 | 3/1904 | Russell | 60/675 |
| 2,442,466 | 6/1948 | Lorphelin | 60/675 |
| 3,509,716 | 5/1970 | Avery | 60/675 X |

*Primary Examiner*—Allen M. Ostrager

[57] ABSTRACT

An elongated arm, pivotally mounted at the center to a support structure, includes a large, bulbous reservoir attached at either end thereof. The arm is hollow and a passageway therethrough joins the two reservoirs. A volatile fluid which vaporizes at a relatively low temperature (125° F. or less) is placed within the reservoir/passageway to provide the activating fluid for the device. A source of heat input is provided in heat exchange relationship with each reservoir when pivoted to its lowermost point, causing the volatile liquid to vaporize and flow to the other end where it condenses, causing the other end to lower. An electrical generator or other energy converter is operatively associated with and operated responsively to the movement of the arm.

1 Claim, 2 Drawing Figures

ENERGY GENERATING DEVICE

BACKGROUND OF THE INVENTION

1. Field of the Invention

The present invention relates to the use of a volatile fluid as an activating agent which may be vaporized at a relatively low temperature and used to operate a pivot arm structure. The rocking movement of the pivot arm structure resulting from the alternate vaporization and condensation of the volatile fluid at opposite ends of the structure generates mechanical energy at the cenral shaft which may be easily utilized directly or converted to electrical energy.

2. Description of the Prior Art

The most pertinent prior art known to the applicant is the U.S. Letters Pat. No. 3,983,704 to McFarland which is directed to a device for converting solar energy to mechanical energy by using solar heat to expand and vaporize a volatile fluid. As the gas expands in a primary tank, it forces the liquid fluid from the primary tank to an elevated tank. Mechanical energy is generated as the fluid then is allowed to fall past a hydraulic motor and return to the primary chamber. While the McFarland approach is conceptually sound it is believed much heat input will be required to force the liquid volatile fluid to the elevated tank. Also there is considerable efficiency loss due to turbulence and splash of the fluid as it flows through tube 30 and falls onto the hydraulic motor paddles 46.

SUMMARY OF THE PRESENT INVENTION

In the present invention, on the other hand, the continuous vaporization and condensation of the volatile fluid operates a mechanical pivot arm, the movement of which is used to operate an electrical generator or other energy converter. In such an apparatus the vaporized fluid naturally flows to the upper end, utilizing less heat input and eliminating loss of efficiency due to turbulence and splash of the volatile fluid.

In the present invention a mechanical support structure includes a hollow arm pivotally mounted thereto and having bulbous chambers or reservoirs at either end. The chambers are connected by a passageway through the hollow arm, but otherwise are enclosed from the atmosphere. A prescribed amount of a volatile fluid, such as Freon, is placed within the bulbous chamber and the entire arm/chamber structure is pivotally mounted at the mid-point of the arm to a frame. The apparatus then has the appearance of a large teeter-totter. A heat input source, which may be activated by solar heat, waste heat such as discharging hot water, or the like, is positioned adjacent the lowermost point of the path of each bulbous chamber. When the volatile fluid condenses in one of the chambers, that chamber, because of its weight will move downwardly to its lowermost position and thereby raise the other end. The heat input at newly lowered chamber will cause the volatile fluid to vaporize again and travel to the upper empty chamber, where it will condense causing the upper end to lower whereupon the cycle continuously repeats itself. Depending on the weight of the volatile fluid in the system, and the length of the arms, considerable torque may be exerted at the mid-point due to the continuous see-saw motion of the arm.

An energy converter, as for example, an electrical generator with its input shaft mechanically connected to the reciprocating pivotal structure, harnesses and converts the energy generated by the pivot structure to electricity, mechanical power, or the like. Although the generating system according to this invention is not extremely efficient, if the heat input is extremely cheap or free, the system may prove very satisfactory.

It is apparent that the pivot structure might be connected to some mechanical motor output means, so that the energy is used directly rather than converting into electrical energy. Further, the pivot structure could have attached thereto secondary liquid chambers that are alternately raised and lowered to deliver a secondary liquid, such as water into an elevated reservoir, and the elevated water could then be used to operate a turbine or hydraulic motor.

It is therefore an object of the present invention to provide an economical energy generating system.

It is another object of the present invention to provide an economical system for the generation of electrical energy.

A further object of the present invention is to provide an apparatus of the type disclosed wherein the alternate vaporization and condensation of a volatile fluid operates a pivot arm structure to generate energy which can be easily converted to mechanical or electrical outputs according to conventional techniques.

Other objects and a fuller understanding of the invention will become apparent from reading the following description of a preferred embodiment in conjunction with the accompanying drawings in which.

DESCRIPTION OF THE PREFERRED EMBODIMENT

Figure 1:
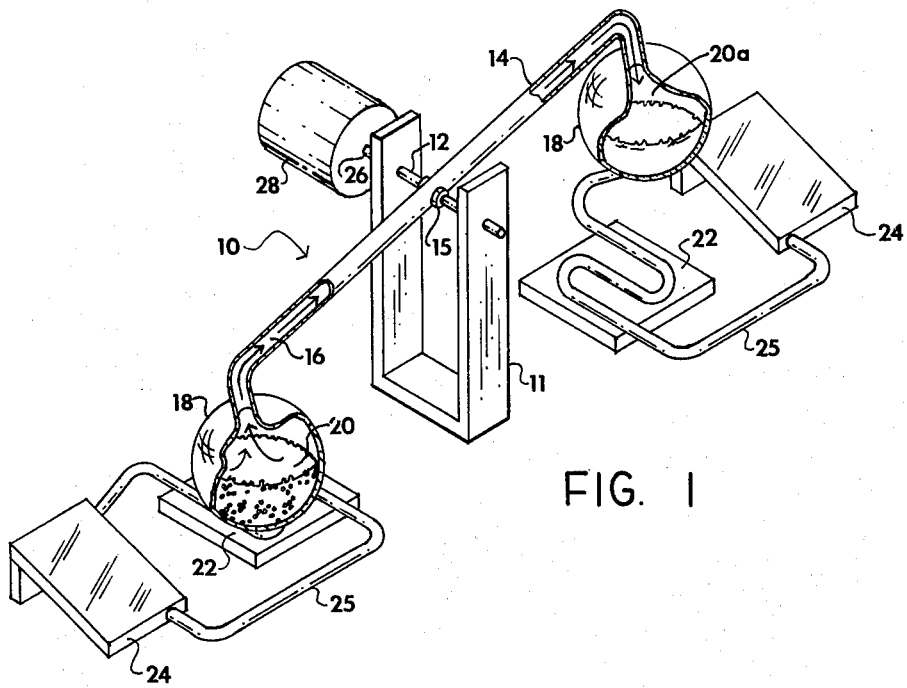
FIG. 1 is a partially schematic and partially cross-sectional side view of the apparatus according to a first embodiment.

Turning now to the drawings, there is illustrated in FIG. 1 a preferred embodiment of the energy generating device according to the present invention which includes, in general, a pivot structure 10 having an elongated arm 14 pivotally mounted thereto at the arm center, and an energy converting device 28 such as a motor, generator, or the like which transforms the energy developed by the pivotal motion of the arm structure 14 to a useful form of electrical or mechanical energy.

More specifically the pivot structure 10 includes a support frame 11 having a horizontal support shaft 12 journalled between the sides 11a, 11b extending parallel to and at a point spaced from the support surface on which the frame 11 rests. The preferably tubular, elongated arm 14 is secured at its mid-point to the horizontal shaft by means of a coupling 15 which further transmits the pivotal movement of the arm 14 to the shaft 12, so that as the arm 14 reciprocates or oscillates, the shaft 12 is caused to reciprocally rotate through an arcuate path.

A reservoir 18 is attached at each end of arm 14 and a conduit, preferably in the form of passageway 16 extending through the tubular arm 14, provides communication between the two reservoirs 18. Otherwise, the reservoirs 18 and passageway 16 are enclosed from the atmosphere. A prescribed amount of a volatile fluid 20, such as, for example Freon 11 or Freon 113 is initially placed within the reservoir/passageway system. The volatile fluid may be any of a number of fluids which have a boiling point at or slightly above normal existing atmospheric conditions. For example, Freon 11 has a boiling point of 74.7° F. and Freon 113 has a boiling point of 117.6° F. Both of these boiling temperatures are fairly easily reached, although the Freon 113 is probably preferred for summertime use while Freon 11 may be preferred for wintertime use. It is entirely possible that the fluid might be replaced periodically throughout the year depending upon the season.

In order to vaporize the volatile fluid 20, a heat exchanger 22 is positioned adjacent each of the lowermost points attained by the two reservoirs 18, so that when a corresponding reservoir is lowered, a heat exchanger will provide the necessary heat input to vaporize the volatile liquid 18. As a heat input to the heat exchanger 22, possible sources include a solar collector 24 which heats and routes a fluid through a conduit 25 to the heat exchanger 22 in a conventional way. Other possible sources of heat input would be waste hot water which is exhausted from many types of industrial operations and would ordinarily be dumped into a stream, cooling lake or pond. The exhaust, hot waste water could be routed by and through the heat exchanger 22 prior to dumping to perform the function of vaporizing the volatile liquid 18. Also exhaust, hot waste gases could be used in the same manner. In any event, any cheap source of heat input may be used to drive the volatile liquid.

An energy conversion unit 28 such as an electrical generator, a motor, or other similar energy converting mechanism is attached to the rotating shaft 12 by means of an input shaft 26. Input shaft 26 may be connected directly to shaft 12, or through a series of gears to gear up or down the rotational motion thereof.

In operation, the embodiment illustrated in FIG. 1 is set in motion by the application of heat to the lowermost of the reservoirs 18 in which the liquid volatile fluid resides. Such application of heat will cause the volatile fluid to vaporize from its liquid state and flow to the opposite end where it will condense in the opposite reservoir 18, thereby causing the pivot arm 14 to tilt in the opposite direction from which it is initially positioned. As the opposite end of the reservoir 18 into which the vaporized volatile fluid 20 enters and condenses, and moves to its lowermost position, a second heat exchange means placed adjacent thus continues back and forth. The pivotal motion of arm 14 is then transferred through shaft 12 and 26 into the energy conversion unit 28.

Figure 2:
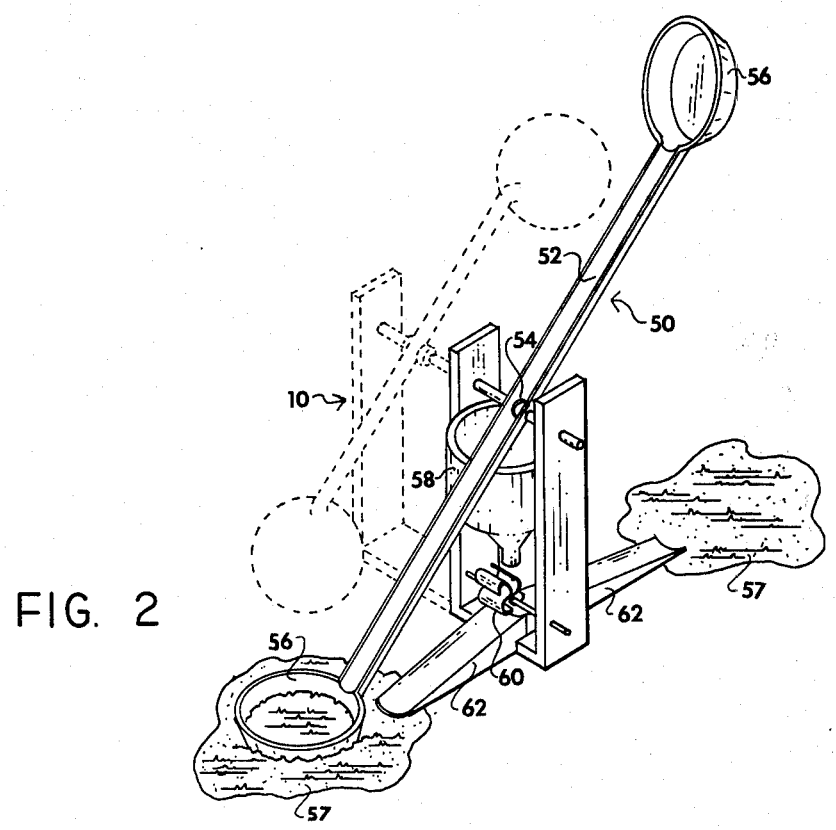
FIG. 2 is a partially schematic and partially cross-sectional side view of the device according to an alternate embodiment.

Turning now to FIG. 2, by way of explanation, the structure of FIG. 1 is repeated in dotted lines and forms the activating means for a different type of energy conversion unit. The similar parts in FIG. 2 which are repeated from FIG. 1 will be illustrated as 10′, 11′, 12′, and so forth. It should be recognized that the pivot arm structure 10′ of FIG. 2 operates in the same manner, the only difference being in the energy converting mechanism 50.

The energy converting mechanism 50 according to FIG. 2 includes an elongated, open-top trough 52 rigidly connected to arm 14′ and having a central opening 54 through the bottom thereof. Each end of the trough is provided with a container means 56 so constructed that when it is lowered into a storage reservoir 57 responsive to the corresponding tilting or lowering of arm 14′, the corresponding container 56 is submerged therein and becomes full of a hydraulic activating fluid, such as water. A priming tank 58 is mounted beneath the opening 54 in trough 52 and contains a turbine or hydraulic motor 60 at the bottom opening thereto, so that when one of the containers 56 is elevated responsive to a lowering of the opposite end of arm 52, a supply of water will run down trough 52 through opening 54 into the primary tank 58. Subsequently, the hydraulic liquid in tank 58 flows through the bottom thereof past turbine 60 thereby activating a hydraulic motor 60, or a generator input shaft. As the water exits through a bottom opening 59 in priming tank 58 it is deposited into a return trough 62, which is slanted in either direction toward the storage reservoirs 57, thereby replenishing the supply of hydraulic fluid therein.

As is evident, the operation of the pivot arm 14′ thereby causes a continuing supply of water to be delivered into tank 58 to operate the hydraulic motor or turbine 60. It is equally evident that the weight of the condensed volatile liquid in the elevated reservoir 18′ must exceed the weight of the water picked up by lowered container 56. In the embodiment of FIG. 2, therefore, the delivery of the hydraulic fluid into priming tank 58, and the passage by gravity therefrom past the turbine or water wheel 60 provides the energy for a motor or generator.

While two embodiments of the invention have been disclosed in detail, it is believed that various modifications and changes might be made to the embodiments illustrated and described without departing from the scope of the invention, which is set forth in the following claims.

What is claimed is:

1. An energy generating device comprising:
 (a) a pivot structure including:
   (i) a support means;
   (ii) an elongated arm pivotally connected at a point intermediate the ends thereof to said support means for reciprocal arcuate movement about a horizontal axis through said intermediate point, whereby each end of said arm moves back and forth between a first lowermost position and a second uppermost position;
   (iii) a reservoir attached to each end of said arm;
   (iv) a conduit extending between and connecting said reservoirs, said reservoirs and conduit being otherwise enclosed from the atmosphere;
   (v) a prescribed quantity of volatile liquid which boils at a relatively low temperature deposited in one of said reservoirs;
 (b) a heat exchange means including a source of heat input thereto operatively associated with each reservoir when positioned in its first lowermost position for causing said volatile fluid in its liquid state to vaporize and flow to the opposite end where it cools and condenses; and
 (c) an energy conversion means connected to said pivot structure for transforming the pivotal movement of said arm to a useful form of output energy;
 (d) said energy conversion means including an elongated trough rigidly connected to said elongated arm, a hydraulic fluid container attached to each end of said trough, a storage reservoir containing a hydraulic fluid positioned in the path of each of said tanks in their lowermost positions, means associated with said tanks for filling said tanks with said hydraulic fluid when in said lowermost position, an outlet opening in the bottom of said trough at the mid-point thereof, a hydraulic fluid priming tank positioned beneath said opening, a fluid responsive rotating member positioned at the bottom of said priming tank and operated responsive to the passage of water of hydraulic fluid therethrough, and a return trough means extending between the outlet of said priming tank and said storage reservoirs for returning hydraulic fluid to said storage reservoirs after passing through said priming tank.

* * * * *